United States Patent
Chun et al.

(10) Patent No.: US 7,864,719 B2
(45) Date of Patent: Jan. 4, 2011

(54) METHOD OF GENERATING LOWER LAYER DATA BLOCK IN WIRELESS MOBILE COMMUNICATION SYSTEM

(75) Inventors: Sung Duck Chun, Gyeonggi-do (KR); Young Dae Lee, Gyeonggi-do (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 418 days.

(21) Appl. No.: 11/910,435

(22) PCT Filed: Mar. 29, 2006

(86) PCT No.: PCT/KR2006/001142

§ 371 (c)(1),
(2), (4) Date: Sep. 2, 2008

(87) PCT Pub. No.: WO2006/104344

PCT Pub. Date: Oct. 5, 2006

(65) Prior Publication Data

US 2008/0310345 A1    Dec. 18, 2008

(30) Foreign Application Priority Data

Mar. 29, 2005  (KR) .................. 10-2005-0026044

(51) Int. Cl.
*H04J 3/08* (2006.01)
*H04J 3/00* (2006.01)
*H04J 1/00* (2006.01)
*H04J 3/24* (2006.01)

(52) U.S. Cl. .............. 370/310; 370/326; 370/336; 370/343; 370/349; 455/91

(58) Field of Classification Search .......... 370/326, 370/328–330, 335–336, 342–343, 345–349; 455/91, 509, 550.1
See application file for complete search history.

(56) References Cited

U.S. PATENT DOCUMENTS

| 6,665,280 | B2 * | 12/2003 | Forssell et al. ............ 370/329 |
| 7,020,106 | B2 * | 3/2006 | Barnard et al. ............ 370/329 |
| 7,292,854 | B2 * | 11/2007 | Das et al. .................... 455/434 |
| 7,352,720 | B2 * | 4/2008 | Chang et al. ............... 370/333 |
| 7,515,616 | B2 * | 4/2009 | Yi et al. ..................... 370/519 |

(Continued)

FOREIGN PATENT DOCUMENTS

EP    1326388    7/2003

(Continued)

*Primary Examiner*—Simon D Nguyen
(74) *Attorney, Agent, or Firm*—Lee, Hong, Degerman, Kang & Waimey (57) ABSTRACT

A method of generating a data block including control information in a specific layer of a mobile communication apparatus having a hierarchical structure constructed with a plurality of layers is disclosed. The present invention includes the steps of inserting a control data block including control information into a first region of a lower layer data block if the lower layer has the control information to be transmitted to a receiving side and inserting at least one portion of the data block of an upper layer into a second region of the lower layer data block, wherein the first region is allocated to the control data block before the second region is allocated to the at least one portion of the upper layer data block.

23 Claims, 10 Drawing Sheets

U.S. PATENT DOCUMENTS

| | | | |
|---|---|---|---|
| 7,768,978 B2* | 8/2010 | Numakura et al. | 370/333 |
| 2005/0074024 A1* | 4/2005 | Kim et al. | 370/432 |
| 2007/0014274 A1* | 1/2007 | Choi | 370/349 |
| 2007/0081513 A1* | 4/2007 | Torsner | 370/349 |
| 2008/0037474 A1* | 2/2008 | Niwano | 370/335 |

FOREIGN PATENT DOCUMENTS

| | | |
|---|---|---|
| WO | 9908457 | 2/1999 |
| WO | 03043228 | 5/2003 |
| WO | WO 2004/042952 | 5/2004 |

* cited by examiner

| D/C | Sequence Number | | | Oct1 |
|---|---|---|---|---|
| Sequence Number | | P | HE | Oct2 |
| Length Indicator | | | E | Oct3(Optional)(1) |
| . . . | | | | |
| Length Indicator | | | E | . . . |
| Data | | | | |
| PAD or a piggybacked STATUS PDU | | | | OctN |

FIG. 4

| D/C | PDU type | SUFI$_1$ | Oct1 |
|---|---|---|---|
| SUFI$_1$ ||| Oct2 |
| ... ||| ⋮ |
| SUFI$_K$ ||| ⋮ |
| PAD ||| OctN |

FIG. 5

| R2 | PDU type | SUFI$_1$ | Oct1 |
|---|---|---|---|
| SUFI$_1$ ||| Oct2 |
| ... ||| ⋮ |
| SUFI$_K$ ||| ⋮ |
| PAD ||| OctN |

FIG. 6

| D/C | PDU Type | RSN | R1 | Oct1 |
|-----|----------|-----|-----|------|
| HFNI ||||  |
| HFNI ||||  |
| HFNI ||||  |
| PAD |||| OctN |

| D/C | Sequence Number | | | Oct1 |
|---|---|---|---|---|
| Sequence Number | | P | HE | Oct2 |
| LI 1 | | | E | Oct3(Optional)(1) |
| ⋮ | | | | |
| LI n | | | E | |
| First LI | | | E | ⋮ |
| Second LI | | | E | |
| SDUs | | | | |
| Piggybacked status PDU | | | | OctN |

FIG. 11

| D/C | Sequence Number | | | Oct1 |
|---|---|---|---|---|
| Sequence Number | | P | HE | Oct2 |
| LI 1 | | | E | Oct3(Optional)(1) |
| ⋮ | | | | |
| LI n | | | E | ⋮ |
| First LI | | | E | |
| SDUs | | | | |
| Piggybacked status PDU | | | | |
| Second LI | | | | OctN |

FIG. 12

| LI |
|---|
| First LI |
| Second LI |
| SDU 3 |
| SDU 4 |
| Piggybacked status PDU |

$n^{th}$ AMD PDU

| LI |
|---|
| SDU 4 |
| SDU 5 |
| ⋮ |

$(n+1)^{th}$ AMD PDU

FIG. 13

METHOD OF GENERATING LOWER LAYER DATA BLOCK IN WIRELESS MOBILE COMMUNICATION SYSTEM

TECHNICAL FIELD

The present invention relates to a wireless mobile communication system, and more particularly, to a method of generating a data block including control information in a specific layer of a mobile communication apparatus having a hierarchical structure constructed with a plurality of layers.

BACKGROUND ART

Figure 1:
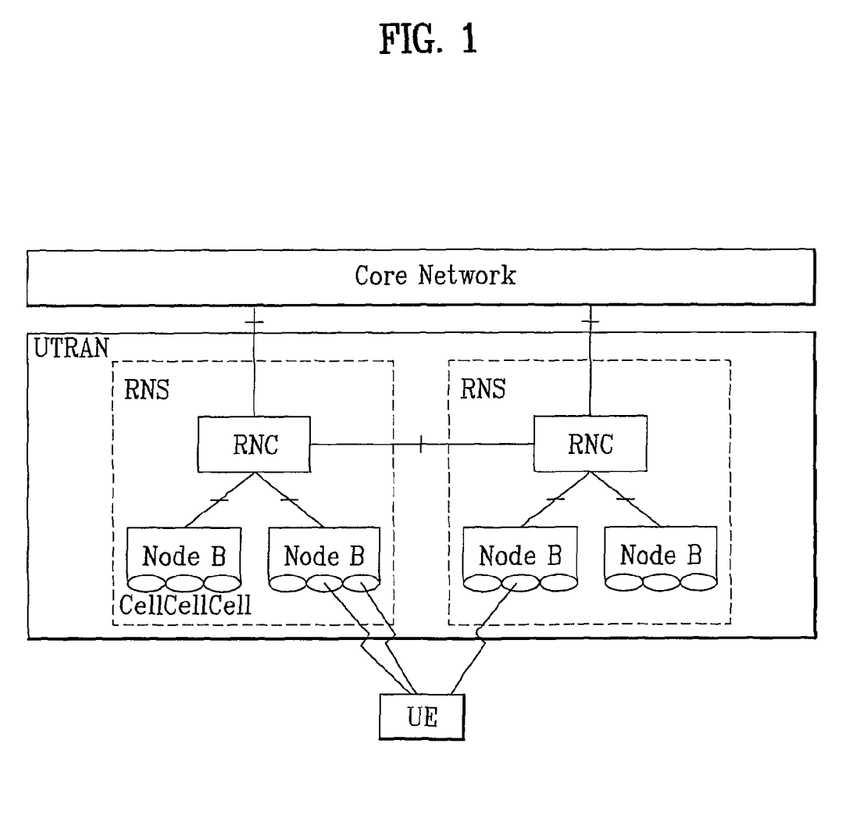
FIG. 1 is a diagram of a network architecture of UMTS (universal mobile telecommunications system) of an asynchronous IMT-2000 system according to a related art.

FIG. 1 is a diagram of a network architecture of UMTS (universal mobile telecommunications system) of an asynchronous IMT-2000 system.

Referring to FIG. 1, a universal mobile telecommunications system (hereinafter abbreviated UMTS) mainly includes a user equipment (hereinafter abbreviated UE), a UMTS terrestrial radio access network (hereinafter abbreviated UTRAN) and a core network (hereinafter abbreviated CN).

The UTRAN includes at least one radio network sub-system (hereinafter abbreviated RNS). And, the RNS includes one radio network controller (hereinafter abbreviated RNC) and at least one base station (hereinafter called Node B) managed by the RNC. And, at least one or more cells exist in one Node B.

Figure 2:
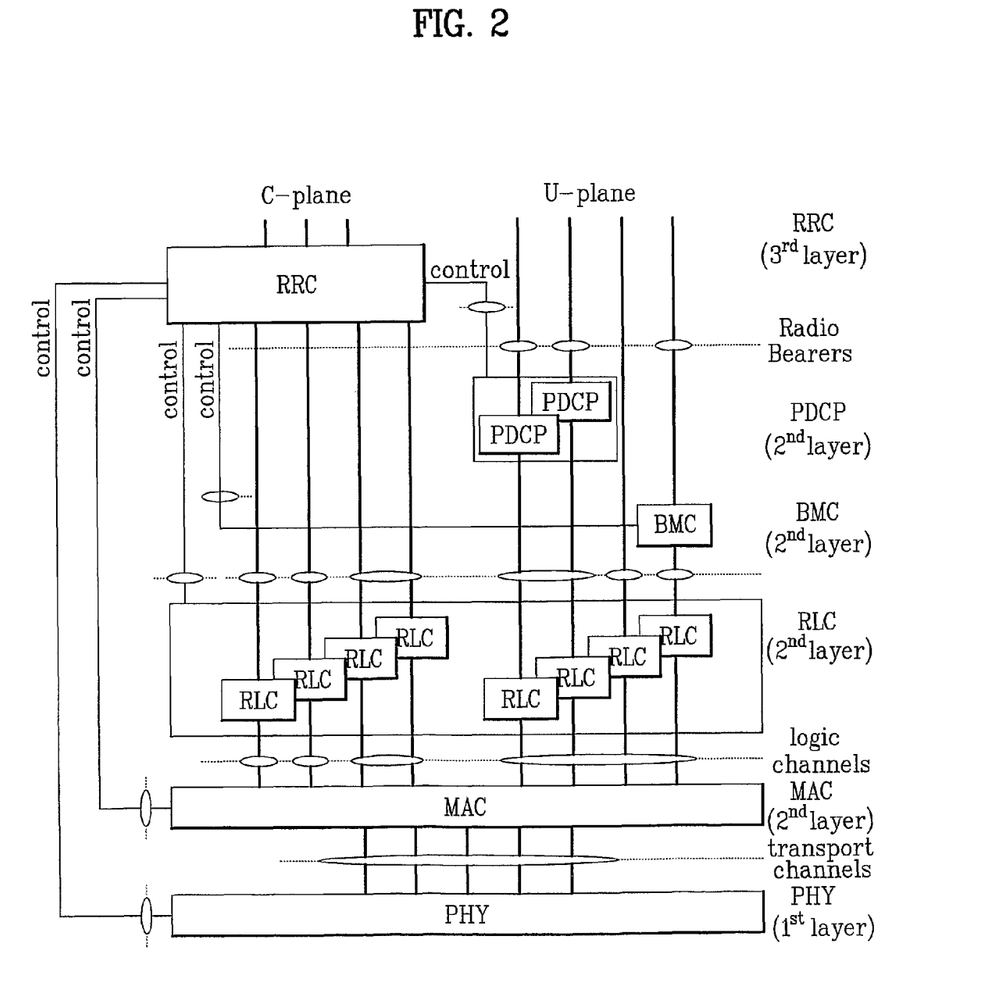
FIG. 2 is an architectural diagram of a radio protocol used in a UMTS system according to a related art.

FIG. 2 is an architectural diagram of a radio protocol used in UMTS.

Referring to FIG. 2, a plurality of radio protocol layers exist as pairs in UE and UTRAN, respectively to take charge of a data transmission in a radio section. Each of the radio protocol layers is explained as follows.

First of all, a physical layer (PHY) as Layer 1 plays a role in transmitting data in a radio section using various radio transmission schemes. The physical layer (PHY) is connected to a MAC layer as an upper layer via a transport channel. And, the transport channels can be classified into a dedicated transport channel and a common transport channel according to a presence or non-presence of a channel sharing.

In Layer 2, MAC (medium access control), RLC (radio link control), PDCP (packet data convergence protocol) and BMC (broadcast/multicast control) layers exist. The MAC layer plays a role as mapping various logical channels to various transport channels and as logical channel multiplexing for mapping several logical channels to one transport channel. The MAC layer is connected to the RLC layer as an upper layer via a logical channel. And, the logical channels are mainly classified into a control channel for transferring information of a control plane and a traffic channel for transferring information of a user plane according to a type of information to be transported.

The MAC layer is divided into a MAC-b sublayer, a MAC-d sublayer, a MAC-c/sh sublayer, a MAC-hs sublayer and a MAC-e sublayer according to a type of a transport channel managed in detail.

The MAC-b sublayer takes charge of management of a transport channel BCH (broadcast channel) responsible for a broadcast of system information. The MAC-c/sh sublayer manages such a common transport channel shared with other UEs as FACH (forward access channel), DSCH (downlink shared channel) and the like. The MAC-d sublayer takes charge of managing DCH (dedicated channel) as a dedicated transport channel for a specific UE. The MAC-hs sublayer manages HS-DSCH (high speed downlink shared channel) as a transport channel for high speed downlink data transmission to support high speed data transmission in downlink or uplink. And, the MAC-e sublayer manages E-DCH (enhanced dedicated channel) as a transport channel for high speed uplink data transmission.

The RLC layer takes charge of securing a quality of service (hereinafter abbreviated QoS) of each radio bearer (hereinafter abbreviated RB) and a corresponding data transmission. An RLC places one or two independent RLC entities in each RB to secure a generic QoS of the corresponding RB and offers three kinds of RLC modes including TM (transparent mode), UM (unacknowledged mode) and AM (acknowledged mode) to support various QoS. And, the RLC plays a role in adjusting a data size to be suitable for a lower layer to transfer data in a radio section. For this, the RLC generates PDU (protocol data unit) by segmenting and concatenating SDU (service data unit) data received from an upper layer and then delivers the PDU to a lower layer.

The PDCP layer is placed above the RLC layer and enables data, which is transferred using such an IP packet as IPv4 or IPv6, to be efficiently transferred in a radio section having a relatively small bandwidth. For this, the PDCP layer performs header compression which is to raise transport efficiency of a radio section by transferring necessary information via header of data only. Since header compression is a basic function of the PDCP layer, the PDCP layer exists in a packet service (PS) domain only. And, one PDCP entity exists per RB to provide effective header compression to each packet service (PS).

In Layer 2, the BMC (broadcast/multicast control) layer exists above the RLC layer. The BMC layer schedules a cell broadcast message and performs a function of broadcasting on UEs located within a specific cell.

A radio resource control (RRC) layer placed on a lowest part of Layer 3 is defined on the control plane only. The RRC layer, which is associated with configuration, reconfiguration and release of RBs, controls parameters of Layer 1 and Layer 2 and takes charge of controlling logical, transport and physical channels. In this case, the RB means a logical path provided by Layer 1 and Layer 2 of a radio protocol for a data delivery between UE and UTRAN. Generally, 'configuring RB' means that characteristics of a radio protocol layer and channel necessary for providing a specific service are regulated and that each detailed parameter and operational method are established.

The RLC layer is explained in detail as follows.

First of all, basic functions of the RLC layer are a guarantee for QoS of each RB and a corresponding data transmission. Since an RB service is a service Layer 2 of a radio protocol provides to a higher layer, the whole parts of Layer 2 affect the QoS. Specifically, the RLC considerably affects the QoS. The RLC leaves an independent RLC entity on each RB to guarantee generic QoS of the corresponding RB. And, the RLC provides three kinds of RLC modes such as a transparent mode (hereinafter abbreviated TM), an unacknowledged mode (hereinafter abbreviated UM) and an acknowledged mode (hereinafter abbreviated AM) to support various kind of QoS. Each of the three modes of the RLC supports a different QoS. So, the three modes of the RLC differ from each other in an operational method and in a detailed function. Hence, the RLC needs to be taken into consideration in aspect of its operational mode.

The transparent mode (TM) is a mode that no overhead is attached to RLC SDU delivered from an upper layer in configuring RLC PDU. Namely, since the RLC lets SDU pass transparently, it is called TM RLC. And, the TM RLC performs the following roles in user and control planes. In the user plane, since a data processing time is relatively short within RLC, the TM RLC takes charge of transmission of real-time circuit data such as voice or streaming in a circuit service domain (hereinafter abbreviated CS domain). In the control plane, since there is no overhead within RLC, the TM RLC takes charge of a transmission for an RRC message from an unspecific UE in case of uplink or a transmission for an RRC message broadcast to all UEs within a cell in case of downlink.

Unlike TM, a mode that an overhead is attached by RLC is called a non-transparent mode. And, the non-transparent mode is classified into a UM (unacknowledged mode) having no acknowledgement for the transmitted data and an AM (acknowledged mode) for the transmitted data. UM RLC sends PDUs by attaching a PDU header including a sequence number (hereinafter abbreviated SN) to each of the PDUs so that a receiving side can know what PDU is lost in the course of transmission. In a user plane, Owing to this function, the UM RLC mainly takes charge of a transmission of broadcast/multicast data or real-time packet data such as voice (e.g., VoIP) and streaming in a packet service domain (hereinafter abbreviated PS domain). In a control domain, the UM RLC takes charge of a transmission of an RRC message requiring no acknowledgement among RRC message transmitted to a specific UE or a specific UE group within a cell.

AM RLC configures PDU by attaching a PDU header including SN like the UM RLC. Yet, the AM RLC makes a great difference from the UM RLC in that a receiving side makes an acknowledgement for PDU transmitted by a transmitting side. The receiving side makes the acknowledgement in the AM RLC, which is because the receiving side makes a request for a transmitting side's retransmission of the PDU failing in being received by the receiving side. And, this retransmission function is an outstanding feature of the AM RLC. So, the object of the AM RLC is to guarantee an error-free data transmission via the retransmission. And, the AM RLC mainly takes charge of a transmission of non-real-time packet data such as TCP/IP of the PS domain in the user plane. In the control plane, the AM RLC takes charge of a broadcast of an RRC message necessarily requiring acknowledgement among RRC messages transmitted to a specific UE within a cell.

In aspect of directionality, TM RLC and UM RLC are used for uni-directional communications. On the other hand, AM RLC is used for bi-directional communications sue to feedback from a receiving side. Since the bi-directional communications are mainly used for point-to-point communications, the AM RLC uses a dedicated logical channel only. In structural aspect, one RLC entity of TM or UM RLC is constructed with one structure of transmission or reception, whereas both transmitting and receiving sides exist within one RLC entity of the AM RLC.

The complication of the AM RLC is attributed to the retransmission function. For the retransmission management, the AM RLC needs a retransmission buffer as well as a transceiver buffer. And, the AM RLC performs various functions such as a use of transmitting/receiving window for a flow control, polling that a transmitting side makes a request for status information to a receiving side of a peer RLC entity, a status report that a receiving side makes a report of its buffer status to a transmitting side of a peer RLC entity, status PDU for carrying status information, a piggyback of inserting status PDU within data PDU to raise efficiency of data transmission, etc. Besides, there is a reset PDU that makes a request for resets of all actions and parameters to AM RLC entity of the other side in case that AM RLC entity discovers crucial error in an operational process or a reset ack PDU used for an acknowledgement of the reset PDU. To support theses functions, the AM RLC needs various protocol parameters, status parameters and a timer. PDU used for the control of data transmission in AM RLC such as status report or status PDU, reset PDU and the like is called control PDU. And, PDU used in delivering user data is called data PDU.

In brief, PDU used by AM RLC can be mainly classified into two types. A first type is data PDU and a second type is control PDU. The control PDU can be classified into four types including status PDU, piggybacked status PDU, reset PDU and reset ack PDU.

As mentioned in the foregoing description, one of the cases of using control PDU is a reset procedure. The reset procedure is used in solving an erroneous situation in an operation of AM RLC. For instance, the reset procedure is used in solving a situation that mutually used sequence numbers are different from each other or that PDU or SDU fails in transmission over a predetermined count. If the reset procedure is used, AM RLC of a receiving side and AM RLC of a transmitting side reset environmental variables to enter a state for resuming communications.

The reset procedure is executed in a following manner.

First of all, AM RLC of a transmitting side includes a currently used HFN (hyper frame number) value in a transmitting direction in a reset PDU and then transmits the reset PDU to a receiving side.

In case of receiving the reset PDU, AM RLC of a receiving side resets a HFN value in its receiving direction and initializes environmental variables such as a sequence number and the like.

And, the AM RLC of the receiving side includes its HFN in its transmitting direction in a reset ack PDU and then transmits the reset ack PDU to the AM RLC of the transmitting side.

Once receiving the reset ack PDU, the AM RLC of the transmitting side resets the HFN value in its receiving direction and then initializes environmental variables.

Figure 3:
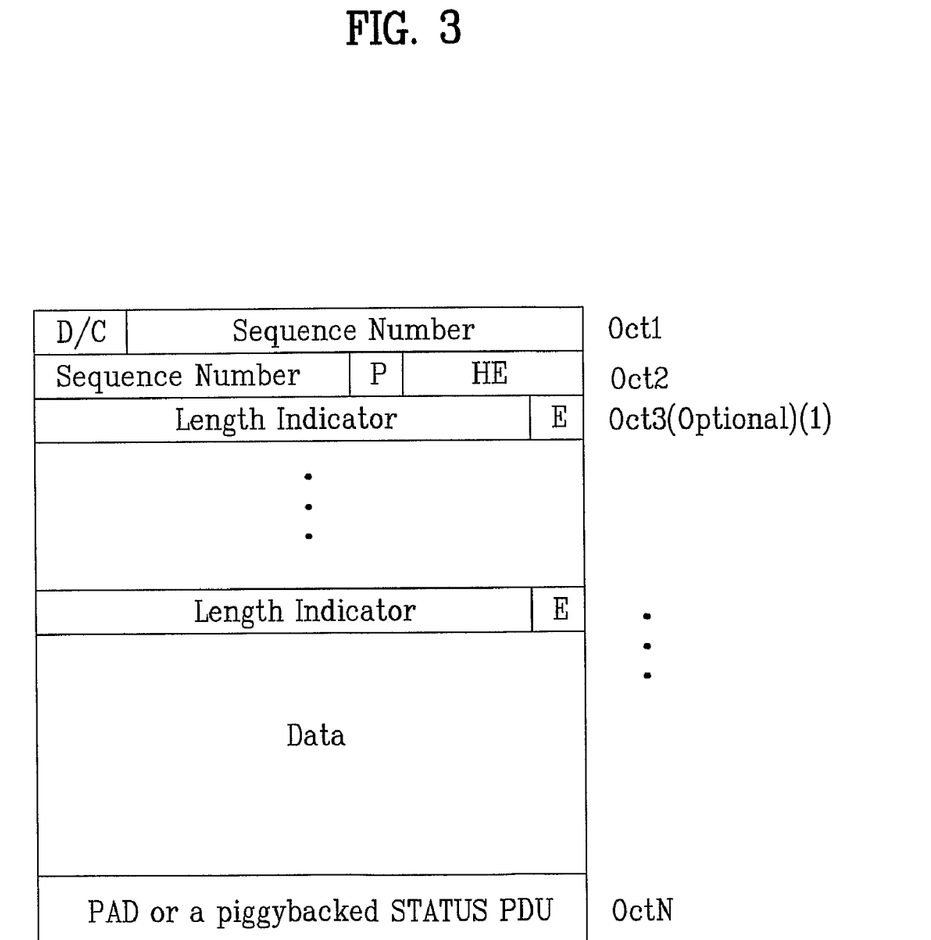
FIG. 3 is a structural diagram of AM RLC PDU (AMD PDU) as data PDU that is used in transmitting data.

FIG. 3 is a structural diagram of AM RLC PDU (AMD PDU) as data PDU that is used in transmitting data.

Referring to FIG. 3, AM RLC PDU is used in case that AM ELC entity attempts to transmit user data, piggybacked status information or polling bit. A user data part is constructed by an integer multiplication of 8 bits. And, a header of the AM RLC PDU is constructed with a sequence number having a 2-octet size. Moreover, a header part of the AM RLC PDU includes a length indicator (LI).

Figure 4:
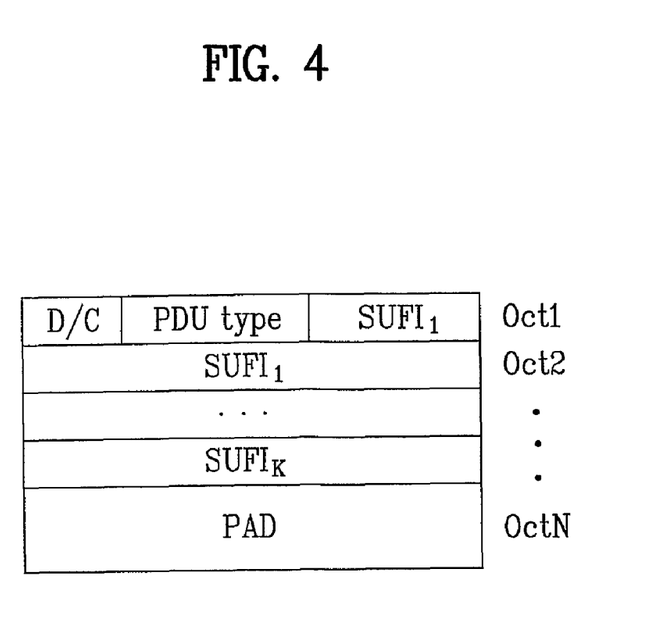
FIG. 4 is a structural diagram of a status PDU according to a related art.

FIG. 4 is a structural diagram of status PDU.

Referring to FIG. 4, a status PDU includes different kinds of super fields (SUFIs). A size of the status PDU is variable but is limited to a size of a biggest RLC PDU of a logical channel carrying the status PDU. In this case, the SUFI plays a role as information indicating what kind of AM RLC PDU arrives at a receiving side or what kind of AM RLC does not arrive at the receiving side. The SUFI is constructed with three parts of type, length and value.

Figure 5:
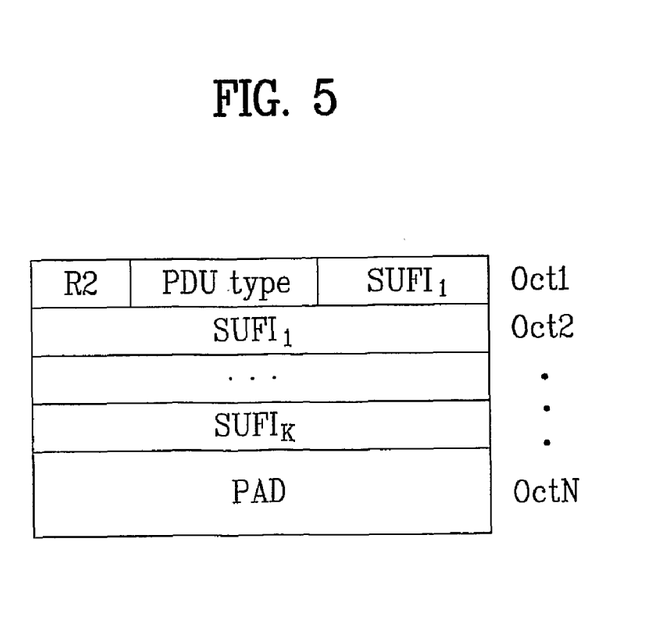
FIG. 5 is a structural diagram of a piggybacked status PDU according to a related art.

FIG. 5 is a structural diagram of piggybacked status PDU.

Referring to FIG. 5, a structure of a piggybacked status PDU is similar to that of a status PDU. The piggybacked status PDU differs from the status PDU in that a D/C field is replaced by a reserved bit (R2).

The piggybacked status PDU is inserted in AM RLC PDU in case that a sufficient space remains. And, a PDU type value (type_) is always fixed to '000'.

Figure 6:
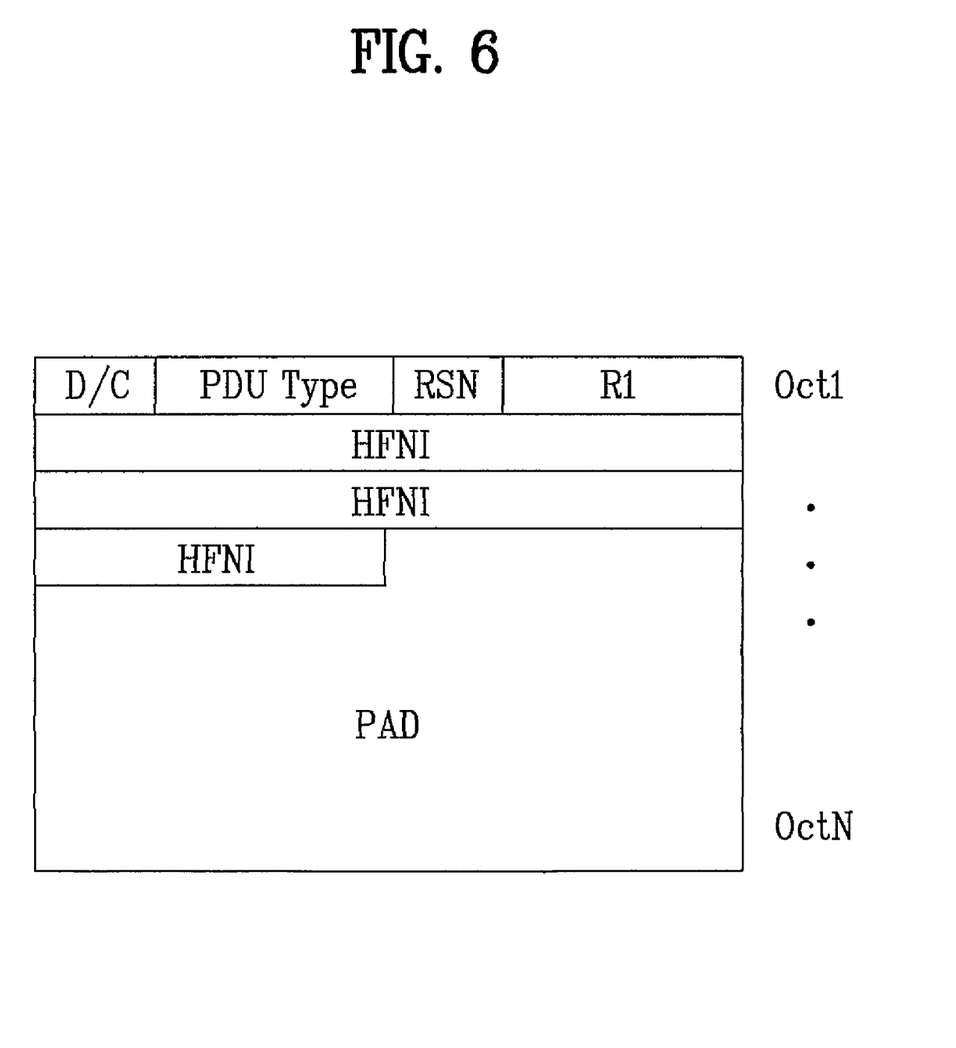
FIG. 6 is a structural diagram of a reset/reset ack PDU according to a related art.

FIG. 6 is a structural diagram of reset/reset ack PDU.

Referring to FIG. 6, a reset PDU includes a sequence number of 1-bit RSN.

And, a reset ack PDU is transmitted in response to a received reset PDU and is transmitted by including the RSN included in the received reset PDU.

Parameters used in the above PDU formats are explained in detail as follows.

1) D/C Field: D/C filed is a filed indicating whether a corresponding PDU is a control PDU or a data PDU.

2) PDU Type: PDU type indicates a type of a control PDU. IN particular, the PDU type indicates whether a corresponding PDU is a reset PDU or a status PDU.

3) Sequence Number: This value means sequence number information of AM RLC PDU.

4) Polling Bit (P): This value is set in case that a request for a status report is made to a receiving side.

5) Extension Bit (E): This value indicates whether a next octet is a length indicator or not.

6) Reserved bit (R1): This value is used for a reset PDU or a reset ack PDU and is coded into 000.

7) Header Extension Bit (HE): This value indicates whether a next octet is a length indicator or data.

8) Length Indicator: This value indicates a location of a boundary in case that a boundary between different PDUs exists within a data part of PDU.

9) PAD: This part is a padding area that is not used for AM RLC PDU.

As mentioned in the foregoing description, a status PDU corresponds to a case that control information and padding information are included within one AMD PDU (AM data PDU). And, a piggybacked status PDU means control information when user data and control information are placed within one AMD PDU. A format of the piggybacked status PDU is substantially identical to that of the status PDU. Yet, these PDUs are classified according to how one AMD PDU is filled.

Since the piggybacked status PDU or the status PDU is not user data, they should be minimally transmitted to raise efficiency in aspect of data transmission. Yet, in data transmission of AM RLC, since a transmitting side always needs acknowledgement indicating that data is correctly received from a receiving side, it is unable to completely reduce the transmission of the status PDU or the piggybacked status PDU.

In An RLC operation according to a related art, AM RLC preferentially transmits control information in case that there are control information and user data to be transmitted. In transmitting the control information, a UE is unable to use the piggybacked status PDU in case that there is no spare space in AMD PDU. Hence, the UE transmits the control information using the status PDU. In this case, a transmission of the AMD PDU configured in advance may be delayed.

Figure 7:
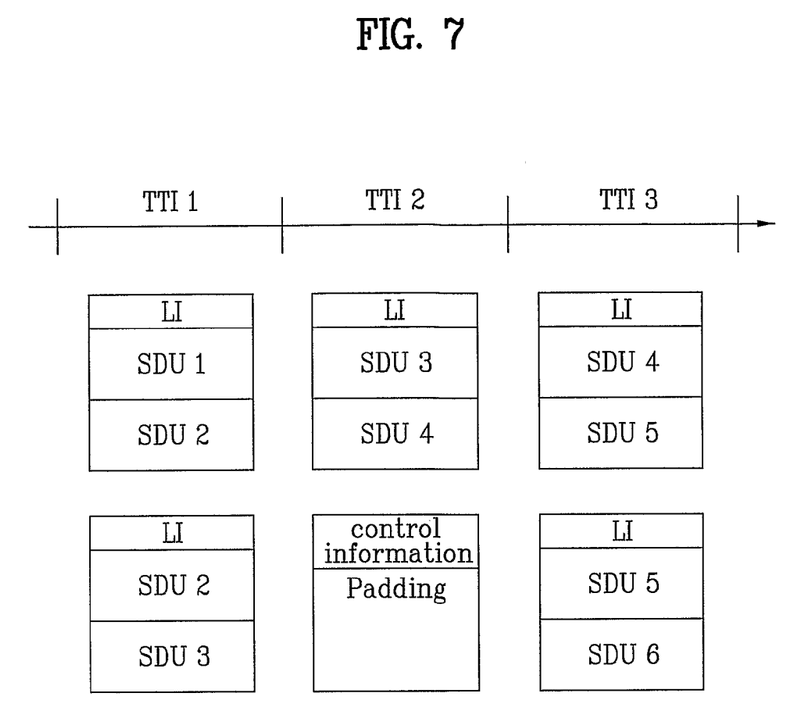
FIG. 7 is an exemplary diagram for explaining an operation of an AM RLC according to a related art.

FIG. 7 is an exemplary diagram for explaining an operation of AM RLC according to a related art.

Referring to FIG. 7, it is assumed that maximum two PDUs can be transmitted during one TTI transmit time interval) and that AM RLC has sufficient data to be transmitted. So, it is assumed that the AM RLC lies in a situation that there are data enough to fill up AM RLC PDU.

Since AM RLC has no control information to be transmitted during TTI 1, AMD PDU including user data only is configured and transmitted. During TTI 2, in case that there is control information to be transmitted, the AM RLC has to transmit the control information to AM RLC of the other side using status PDU or piggybacked status PDU. Yet, since it is assumed that the AM RLC has sufficient user data to be transmitted, a padding bit cannot be generated no matter how the AMD PDU is configured. So, the piggybacked status PDU cannot be included. Hence, the AM RLC has to transmit the control information using the status PDU. In this case, on the assumption that the AM RLC can use maximum twp AMD PDUs during one TTI, the AM RLC transmits one AMD PDU including user data only and one status PDU during TTI 2. And, AMD PDU including user data only like TTI 1 is transmitted during TTI 3.

However, the related art has the following problems.

First of all, in spite that there is sufficient data to be transmitted by AM RLC, in case that a size of status report is smaller than that of AMD PDU, a padding bit having no significance as information, as shown in FIG. 7, exists in a status PDU. This means a serious transmission efficiency reduction in case that there are excessive user data to be transmitted by the AM RLC.

As mentioned in the foregoing description, in using the piggybacked status PDU rather than the status PDU, a portion making a configuration of PDU inefficient like a padding bit is reduced. Yet, in the related art, the piggybacked status PDU is not facilitated to use. The reason is explained as follows. First of all, in case that there are control information and user data to be transmitted, AM RLC preferentially fills AM PDU with the user data and then inserts the control information in a spare space of the AMD PDU in a format of a piggybacked status PDU. Meanwhile, in the related art, in case that a piggybacked status PDU is included in a specific AMD PDU, a portion or whole portions of SDU included right prior to the piggybacked status PDU should correspond to a last portion of the SDU. In particular, a first portion of a AMD PDU transmitted next to the AMD PDU including the piggybacked status PDU starts as a first portion of a new SDU.

Figure 8:
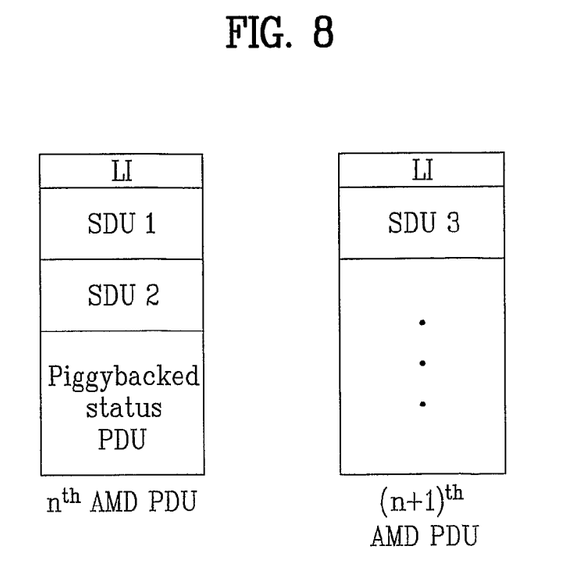
FIG. 8 is a diagram for explaining a method of configuring an AMD PDU including piggybacked status information according to a related art.

FIG. 8 is a diagram for explaining a method of configuring AMD PDU including piggybacked status information according to a related art.

Referring to FIG. 8, in case that user data and control information to be transmitted exist, AM RLC-insets SDU 1 and SDU 2 in an $n^{th}$ AMD PDU and then decides whether there is a space in which the control information can be inserted in a format of a piggybacked status PDU into the $n^{th}$ AMD PDU. If it is decided that the control information can be inserted into the $n^{th}$ AMD PDU, the piggybacked status PDU is inserted. In doing so, the SDU 2 located ahead of the piggybacked status PDU should be ended in front of the piggybacked status PDU and cannot be included in an $(n+1)^{th}$ AMD PDU. In other words, if the SDU is segmented into at least two portions, it is unable to include one portion in the $n^{th}$ AMD PDU and the other portion in the $(n+1)^{th}$ AMD PDU.

However, in the related art, a size of a piggybacked status PDU is limited to a space remaining after AMD PDU is filled up with at least one SDU. So, even if AM RLC needs to use the piggybacked status PDU, it is frequently unable to use the corresponding PDU. If control information to be transmitted to a receiving side is generated, it is highly probable that the AM RLC may use status PDU rather than the piggybacked status PDU which is more advantageous in aspect of transmission efficiency. Hence, the transmission efficiency of the control information becomes is further lowered.

DISCLOSURE OF THE INVENTION

Accordingly, the present invention is directed to a method of generating a data block that substantially obviates one or more of the problems due to limitations and disadvantages of the related art.

An object of the present invention is to provide a method of generating a data block, by which efficiency in using limited resources by layers of transmitting and receiving sides in a wireless mobile communication system can be raised.

Another object of the present invention is to provide a method of generating a data block, by which a maximum user data rate can be achieved in a wireless mobile communication system.

Another object of the present invention is to provide a method of generating a data block, by which control information transmission efficiency can be increased in a wireless mobile communication system.

Another object of the present invention is to provide a transmitter and receiver, by which a maximum user data rate is achieved in a manner of raising efficiency in using limited resources in a wireless mobile communication system and by which control information transmission efficiency is increased.

A further object of the present invention is to provide a data block structure, by which a maximum user data rate is achieved in a manner of raising efficiency in using limited resources in a wireless mobile communication system and by which control information transmission efficiency is increased.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of generating a data block from a lower layer of a transmitting side in a mobile communications system according to the present invention includes the steps of inserting a control data block including control information into a first region of a lower layer data block if the lower layer has the control information to be transmitted to a receiving side and inserting at least one portion of the data block of an upper layer into a second region of the lower layer data block, wherein the first region is allocated to the control data block before the second region is allocated to the at least one portion of the upper layer data block.

Preferably, the second region is located within a remaining part of the lower layer data block except the first region.

Preferably, the method further includes the step of inserting a first indicator indicating that the lower layer data block includes the control data block.

More preferably, the method further includes the step of inserting a second indicator for providing information associated with the first region.

More preferably, the information associated with the first region includes a starting position of the first region within the lower layer data block.

More preferably, the information associated with the first region includes a length of the control data block.

Preferably, the control information is reception status information.

More preferably, the first region is located at an end of the lower layer data block.

More preferably, the second indicator is inserted into an end of the first region.

Preferably, the method further comprising the step of if a portion of the upper layer data block is inserted into the lower layer data block, inserting another portion of the upper layer data block into a next data block of the lower layer.

To further achieve these and other advantages and in accordance with the purpose of the present invention, a method of generating an upper layer data block from a lower layer of a receiving side in a mobile communications system includes the steps of receiving a first data block of the lower layer, the first data block having a first portion of a data block of an upper layer and a control data block including control information, receiving a second data block of the lower layer having a second portion of the upper layer data block, and generating the upper layer data block using the first and second portions of the upper layer data block.

To further achieve these and other advantages and in accordance with the purpose of the present invention, a transmitter having a lower layer entity for generating a lower layer data block to be transmitted to a receiving side from a lower layer in a mobile communications system, the lower layer including a means for allocating a first region of the lower layer data block to insert a control data block including control information into the lower layer data block before at least one portion of a data block of an upper layer is inserted into the lower layer data block, a means for inserting the control data block into the first region of the lower layer data block if the lower layer has the control information to be transmitted to the receiving side, and a means for inserting the at least one portion of the upper layer data block into a second region of the lower layer data block.

To further achieve these and other advantages and in accordance with the purpose of the present invention, a receiver having a lower layer entity for generating a data block of an upper layer in a mobile communications system includes a means for receiving a first data block of a lower layer, the first data block having a first portion of the data block of the upper layer and a control data block including control information, a means for receiving a second data block of the lower layer having a second portion of the upper layer data block, and a means for generating the upper layer data block using the first and second portions of the upper layer data block.

To further achieve these and other advantages and in accordance with the purpose of the present invention, a structure of a lower layer data block generated from a lower layer to deliver control information to a receiving side in a mobile communications system includes a control data block including the control information located at a first region of the lower layer data block, at least one portion of a data block of an upper layer located at a second region of the lower layer data block, a first indicator indicating that the lower layer data block includes the control data block, and a second indicator providing information associated with at least one of a location and size of the control data block.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 9:
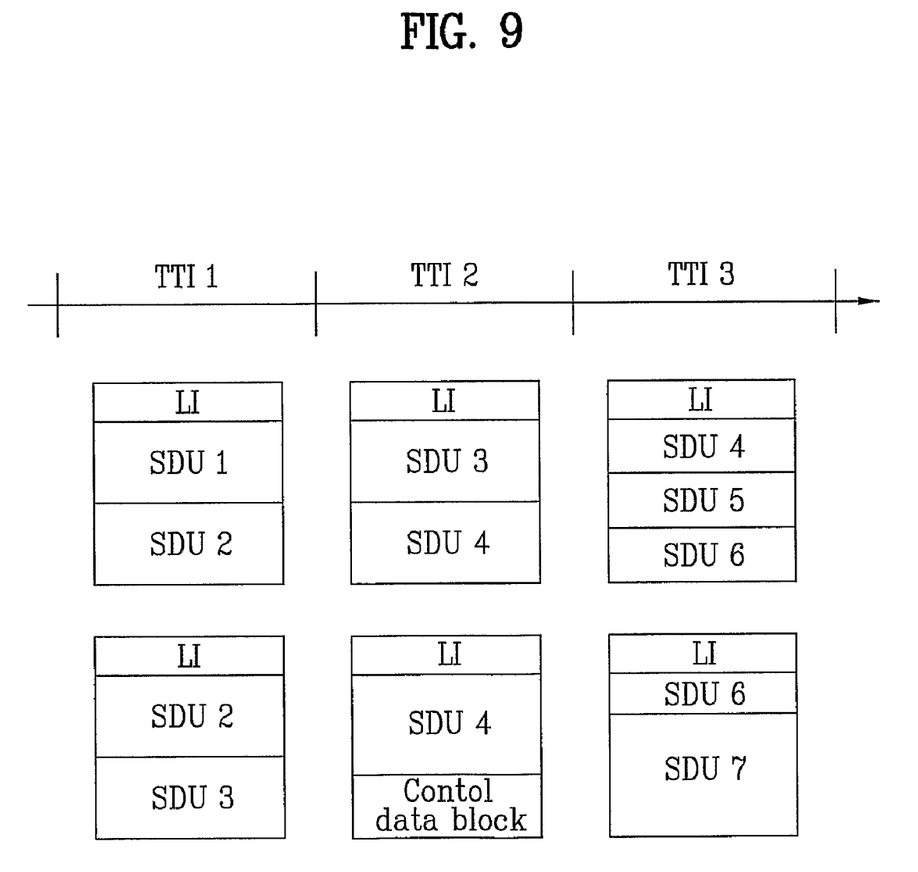
FIG. 9 is a diagram of a method of generating a data block according to one preferred embodiment of the present invention.

FIG. 9 is a diagram of a method of generating a data block according to one preferred embodiment of the present invention.

Embodiments in the following description are examples that technical features of the present invention are applied to the 3GPP mobile communication system. In particular, the following embodiments includes a method of generating a AM protocol data unit (AMD PDU) in an RLC layer of a communication system having a plurality of protocol stack structures including a physical layer, a MAC layer, the RLC layer and a PDCP layer using service data unit (SDU) and control information delivered from an upper layer, a transmitter thereof, a receiver thereof and a structure of the AMD PDU.

In the embodiment shown in FIG. 9, it is assumed that maximum two PDUs can be transmitted during one TTI (transmit time interval) and that an RLC layer has sufficient data to be transmitted. Namely, it is assumed that the RLC layer is ready to fill a AMD PDU completely at any time.

Referring to FIG. 9, assuming that the RLC layer does not have control information to be transmitted at a timing point of TTI 1, the RLC layer configures AMD PDUs including user data, i.e., service data units (SDUs) delivered from an upper layer only and then transmits the AMD PDUs to a receiving side.

In case that the RLC layer has control information to be transmitted to the receiving side at a timing point of TTI 2, the RLC layer preferentially configures an AMD PDU in a manner of including the control information in the AMD PDU and service data units delivered from an upper layer in a spare space of the AMD PDU having the control information included therein and then transmits the configured AMD PDU to the receiving side. A second AMD PDU at TTI 2 schematically represents an example of a new type AMD PDU according to one preferred embodiment of the present invention.

The control information can include status report information (reception status information). Preferably, the control information is constructed in a format of one independent control data block such as a piggybacked status PDU for example. Yet, the control information can be constructed in various ways. The control data block including the control information can be located at a random position within the AMD PDU. In other words, the control data block can be included in an end portion of a header of the AMD PDU, a portion next to the header or an end portion of the AMD PDU.

The AMD PDU including the control data block therein preferably includes a first indicator indicating that the AMD PDU includes the control data block and a second indicator offering information for a location or size of the control data block or information for both of the location and the size of the control data block. And, the second indicator can include information for a starting point at which the control data block starts within the AMD PDU.

In FIG. 9, a portion of SDU 4 is included in a portion right before the control data block within the AMD PDU and another portion of the SDU 4 is included in a first portion of a next AMD PDU at TTI 3. Namely, in the related art, if an AMD PDU includes a piggybacked status PDU, an end portion of a specific SDU should be located at a portion right before the piggybacked status PDU, which is not always applicable to the present invention. So, if a receiving side receives the AMD PDU including the first indicator, it can be recognized that the received AMD PDU includes the control data block and that an uncompleted SDU may be located before the control data block.

And, AMD PDU including user data only is configured at TTI 3 like TTI 1 and is then transmitted to the receiving side.

Figure 10:
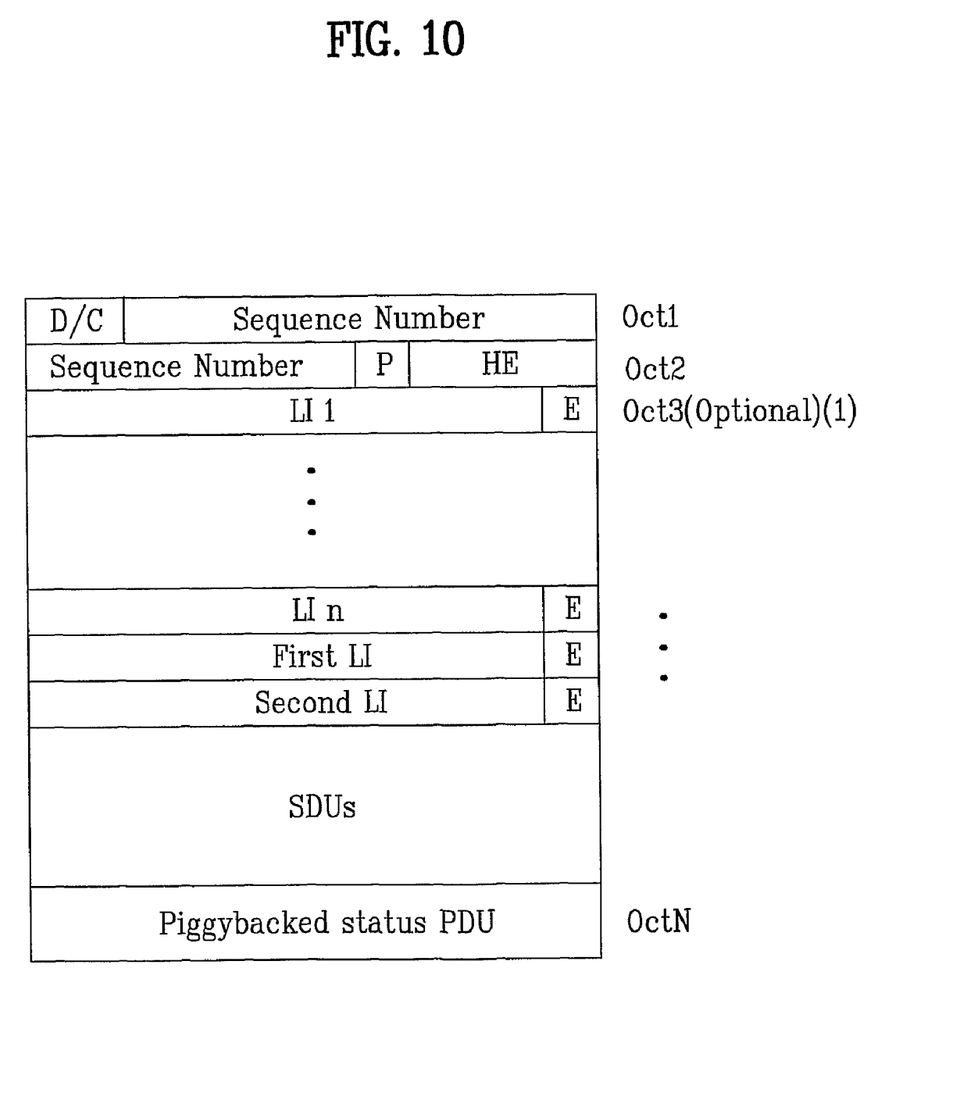
FIG. 10 and FIG. 11 are structural diagrams of AMD PDUs according to preferred embodiments of the present invention.

FIG. 10 is a structural diagram of an AMD PDU according to one preferred embodiment of the present invention.

Referring to FIG. 10, an RLC layer of a transmitting side preferentially includes control information to be transmitted to a receiving side in an AMD PDU and then includes SDUs delivered from an upper layer in a remaining space of the AMD PDU. In this case, LI 1~LI n are length indicators indicating positions of the SDUs included in the AMD PDU, respectively.

'First LI' is an indicator that indicates that the AMD PDU includes the piggybacked status PDU and 'Second LI' is an indicator that indicates a position of the piggybacked status PDU within the AMD PDU. The 'Second LI' can indicate the position of the piggybacked status PDU by including information for at least one of a start point and size of the piggybacked status PDU. Preferably, the 'First LI' is '1111100' or '1111101' in case of 7 bits. Preferably, the 'First LI' uses one of '111111111111100' and '111111111111101'.

Figure 11:
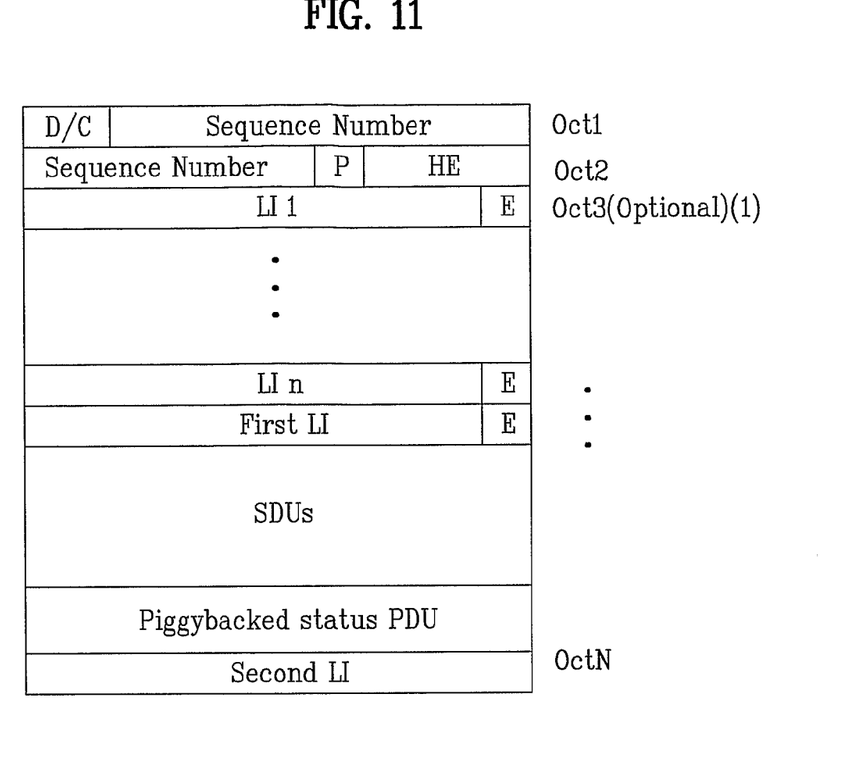

FIG. 11 is a structural diagram of an AMD PDU according to another preferred embodiment of the present invention.

The embodiment in FIG. 1 differs from the former embodiment in FIG. 10 in a location of 'Second LI' within the AMD PDU including a piggybacked status PDU. Namely, by simplifying a header of the AMD PDU, a receiving side can process control information and user data differently.

Referring to FIG. 11, the 'Second LI' is placed next to the piggybacked status PDU to indicate a starting point or size of the piggybacked status PDU. The reason why the 'Second LI' is placed after the piggybacked status PDU is as follows. Since size information of the piggybacked status PDU is not included in a header of the AMD PDU, the receiving side has difficulty in understanding the piggybacked status PDU correctly, if the 'Second LI' is placed before the piggybacked status PDU. Namely, by placing the 'Second LI' at a last portion of the AMD PDU, the receiving side is made to correctly understand a size of the piggybacked status PDU.

Meanwhile, it is also possible to configure one new piggybacked status PDU by merging the piggybacked status PDU and the 'Second LI' together.

Each time a receiving side RLC layer receives an AMD SDU shown in FIG. 10, it is checked whether 'First LI' exists in the received AMD PDU. If the 'First LI' exists, it is decided that a piggybacked status PDU exists within the AMD PDU. After obtaining a position of the piggybacked status PDU from 'Second LI' included within the AMD PDU, the receiving side RLC layer operates according to control information included in the piggybacked status PDU. And, the receiving side RLC layer recovers SDUs included in the AMD PDU using the rest of LIs except the 'First LI' and the 'Second LI' and field values included in a header.

In case that the AMD PDU shown in FIG. 11 is used, a receiving side RLC layer understands that a piggybacked status PDU is included in the AMD PDU from 'First LI' includes in the AMD PDU.

The receiving side RLC layer obtains a position of the piggybacked status PDU from 'Second LI' included in a last portion of the AMD PDU, acquires control information included in the piggybacked status PDU, and then operates according to the acquired information. And, the receiving side RLC layer recovers SDUs included in the AMD PDU using the rest of LIs except the 'First LI' and the 'Second LI' and field values included in a header. After having removed the control information from the AMD PDU, the RLC layer places the AMD PDU within a receiving window using SN information of the AMD PDU.

Figure 12:
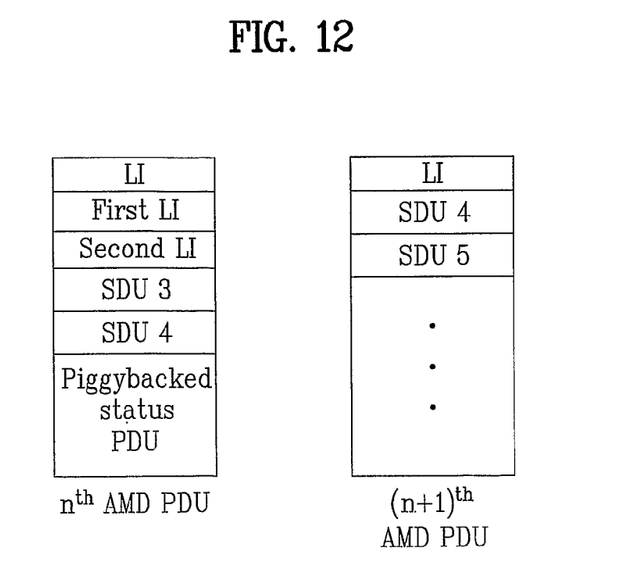
FIG. 12 is a diagram for explaining a process that a receiving side RLC layer operates by receiving AMD PDU according to another preferred embodiment of the present invention.

FIG. 12 is a diagram for explaining a process that a receiving side RLC layer operates by receiving AMD PDU according to another preferred embodiment of the present invention, in which such a part included in a header of AMD PDU as D/C, SN value and the like is omitted for convenience of explanation.

Referring to FIG. 12, a receiving side RLC layer receives an $n^{th}$ AMD PDU and then understands that 'First LI' and 'Second LI' are included in the received AMD PDU. If so, the receiving side RLC layer can find out that the AMD PDU includes a piggybacked status PDU and can find out location information of the piggybacked status PDU. And, the receiving side RLC layer can find out that SDU (SDU 4 in FIG. 12) right before the piggybacked status PDU is not ended at the $n^{th}$ AMD PDU and that a portion of the SDU 4 is included in an $(n+1)^{th}$ AMD PDU. Hence, the receiving side RLC layer can recover the entire SDU 4 using portions of the SDU 4 included in the $n^{th}$ and $(n+1)^{th}$ AMD PDUs.

Alternatively, to simplify implementation of an AMD PDU, a piggybacked status PDU is included within a header of AMD PDU or right after the header. For instance, a structure that a piggybacked status PDU is included right after 'First LI' can be taken into consideration. In this case, the rest of LIs except 'Second LI' offer information for a boundary between SDUs included after the piggybacked status PDU.

The present invention describes a mobile communication system and is also applicable to a wireless communication system for a PDA or notebook computer provided with a wireless communication function. Terminologies described in the present invention are not limited to a range of a wireless communication system. And, the present invention is applicable to a wireless communication system using different wireless interfaces and physical layers such as TDMA, CDMA, FDAM, etc.

Contents of the present invention can be implemented with software, firmware, hardware or combination of them. In particular, the contents of the present invention are implemented using hardware logic such as code, circuit chip and ASIC in hardware or by codes in a computer-readable storage medium such as a hard disc, a floppy disc and a tape, an optical storage, a ROM and a RAM using a computer programming language.

Codes stored in the computer-readable medium are accessible and executable by a processor. The codes implementing the contents of the present invention are accessible via a transmission medium or a file server on network. In this case, a code-implementing device includes a wire transmission medium such as a network transmission line, a wireless transmission medium, signaling, wireless signaling, IR signaling and the like.

Figure 13:
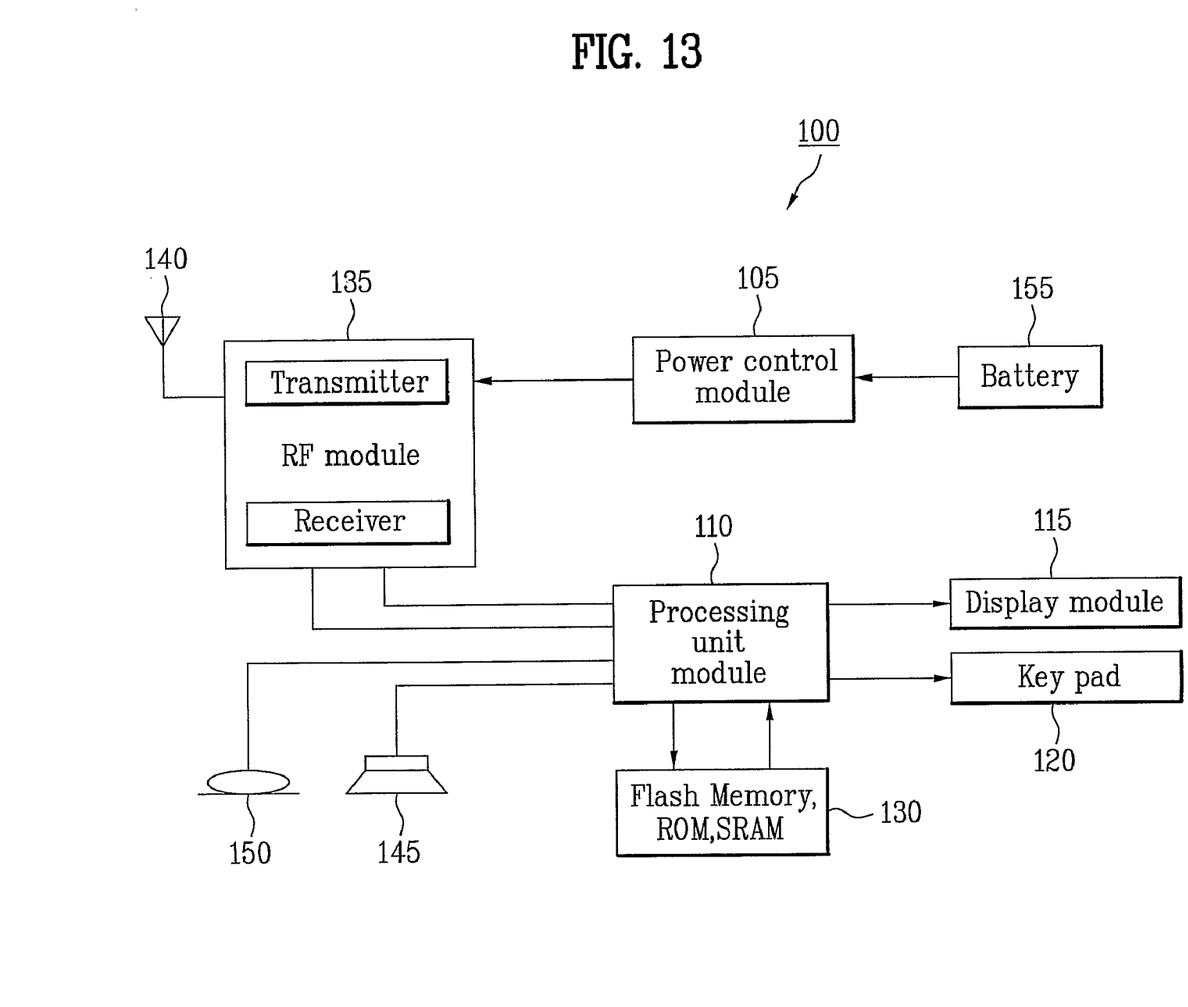
FIG. 13 is a block diagram of a wireless communication apparatus such as a mobile terminal that performs functions of the present invention.

FIG. 13 is a block diagram of a wireless communication apparatus such as a mobile terminal that performs functions of the present invention.

Referring to FIG. 13, a wireless communication apparatus 100 includes a processing unit module 110 such as a microprocessor and a digital processor, an RF module 145, a power control module 106, an antenna 140, a battery 155, a display module 115, a keypad 120, a storage module 130 such as a ROM, an SRAM, and a flash memory, a speaker 145 and a microphone 150.

A user inputs command information such as a phone number by pressing a button or activates voice using the microphone 145.

The processing unit module 110 receives and processes the command information to perform a function requested by the user. The processing unit module 110 searches the storage module 130 for data necessary for performing the function and then uses the data. And, the processing unit module 110 enables the user's command information and the data searched from the storage module 130 to be displayed on the display module 115 for user's convenience.

The processing unit module 110 delivers information to the RF module 135 to transmit a radio signal including voice communication data. The RF module 135 includes a transmitter and a receiver to transmit and receive the radio signal. The radio signal is finally transmitted or received via the antenna 140. Once receiving the radio signal, the RF module 135 converts the radio signal to a baseband frequency to enable the processing unit module 110 to process the radio signal. The converted signal is delivered via the speaker 145 or as readable information.

The RF module 135 is used in receiving data from a network or transmitting information measured or generated by the wireless communication apparatus to the network. The storage module 130 is used in storing the measured or generated by the wireless communication apparatus. And, the processing unit module 110 is appropriately used for the wireless communication apparatus to receive data, process the received data and transmit the processed data.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention is applicable to a mobile communications system such as an LTE system, a 3GPP or 3GPP2 system, or a broadband wireless access system for mobile internet, etc.

The invention claimed is:

1. A method of generating a data block from a lower layer of a transmitting side in a mobile communications system, comprising the steps of:
   inserting a control data block including control information into a first region of a lower layer data block if the lower layer has the control information to be transmitted to a receiving side; and
   inserting at least one portion of the data block of an upper layer into a second region of the lower layer data block,
   wherein the first region is allocated to the control data block before the second region is allocated to the at least one portion of the upper layer data block.

2. The method of claim 1, wherein the second region is located within a remaining part of the lower layer data block except the first region.

3. The method of claim 1, further comprising the step of inserting a first indicator indicating that the lower layer data block includes the control data block.

4. The method of claim 3, further comprising the step of inserting a second indicator for providing information associated with the first region.

5. The method of claim 4, wherein the information associated with the first region includes a starting position of the first region within the lower layer data block.

6. The method of claim 4, wherein the information associated with the first region includes a length of the control data block.

7. The method of claim 4, wherein the first region is located at an end of the lower layer data block.

8. The method of claim 7, wherein the second indicator is inserted into an end of the first region.

9. The method of claim 1, wherein the control information is reception status information.

10. The method of claim 1, further comprising the step of if a portion of the upper layer data block is inserted into the lower layer data block, inserting another portion of the upper layer data block into a next data block of the lower layer.

11. A transmitter having a lower layer entity for generating a lower layer data block to be transmitted to a receiving side from a lower layer in a mobile communications system, comprising:
   a means for allocating a first region of the lower layer data block to insert a control data block including control information into the lower layer data block before at least one portion of a data block of an upper layer is inserted into the lower layer data block;
   a means for inserting the control data block into the first region of the lower layer data block if the lower layer has the control information to be transmitted to the receiving side; and
   a means for inserting the at least one portion of the upper layer data block into a second region of the lower layer data block.

12. The transmitter of claim 11, further comprising a means for inserting a first indicator indicating that the lower layer data block includes the control data block.

13. The transmitter of claim 11, further comprising a means for inserting a second indicator providing information associated with the first region.

14. The transmitter of claim 13, wherein the information associated with the first region includes a starting position of the first region in the lower layer data block.

15. The transmitter of claim 13, wherein the information associated with the first region includes a length of the control data block.

16. The transmitter of claim 11, wherein the control information is reception status information.

17. The transmitter of claim 11, wherein the first region is located at an end of the lower layer data block.

18. The transmitter of claim 11, further comprising, if a portion of the upper layer data block is inserted into the lower layer data block, a means for inserting another portion of the upper layer data block into a next data block of the lower layer.

19. A structure of a lower layer data block generated from a lower layer to deliver control information to a receiving side in a mobile communications system, comprising:
   a control data block including the control information located at a first region of the lower layer data block;
   at least one portion of a data block of an upper layer located at a second region of the lower layer data block;
   a first indicator indicating that the lower layer data block includes the control data block; and
   a second indicator providing information associated with at least one of a location and size of the control data block.

20. The structure of claim 19, wherein the information associated with the location of the control data block includes a starting position of the first region within the lower layer data block.

21. The structure of claim 19, wherein the control information is reception status information.

22. The structure of claim 19, wherein the first region is located at an end of the lower layer data block.

23. The structure of claim 19, wherein the control data block is allocated to the first region before the at least one portion of the upper layer data block is allocated to the second region.

* * * * *